No. 769,517.

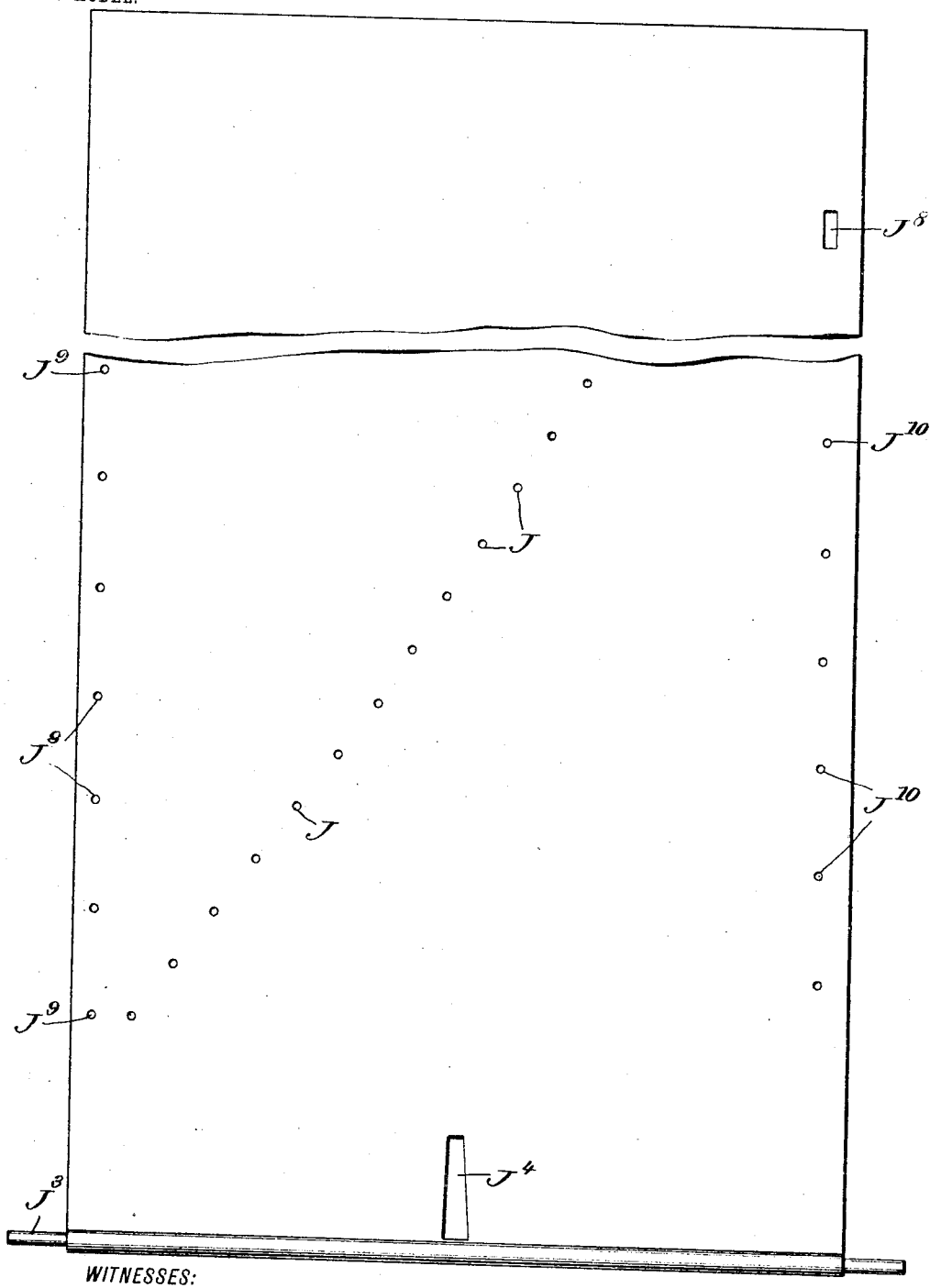

Patented September 6, 1904.

UNITED STATES PATENT OFFICE.

WILLIAM R. VERSTRAELEN AND CHRISTIAN ALTER, OF NEW YORK, N. Y.

NOTE-SHEET.

SPECIFICATION forming part of Letters Patent No. 769,517, dated September 6, 1904.

Original application filed September 3, 1903, Serial No. 171,752. Divided and this application filed April 20, 1904. Serial No. 204,036. (No model.)

*To all whom it may concern:*

Be it known that we, WILLIAM R. VERSTRAELEN and CHRISTIAN ALTER, both citizens of the United States, and residents of the city of New York, borough of Manhattan, in the county and State of New York, have invented a new and Improved Note-Sheet, of which the following is a full, clear, and exact description, this being a division of the application for Letters Patent of the United States for a self-playing zither, Serial No. 171,752, filed by us September 3, 1903.

The object of the invention is to provide a new and improved note-sheet arranged to control the sounding devices of the musical instrument, to govern the forward travel of the note-sheet over the tracker-board, the rewinding of the note-sheet on its spool, and to control the connection of the main wind-chest with the action wind-chest.

The invention consists of novel features and parts and combinations of the same, as will be more fully described hereinafter and then pointed out in the claims.

Reference is to be had to the accompanying drawing, forming a part of this specification, in which the figure is a face view of the improvement.

The note-sheet is preferably made of paper or like flexible material and is provided with the usual apertures J, representing the notations of a piece of music. In practice the note-sheet is in the form of a roll secured at one end to a spool on which the note-sheet winds, and on the outer end of the note-sheet is secured a bar $J^3$, extending beyond the sides of the note-sheet to permit of conveniently connecting the note-sheet with a winding-up roller for drawing the note-sheet over the tracker-board.

In the stringed musical instrument shown and described in the application for Letters Patent above referred to use is made of a main exhaust-chest from which air is exhausted by bellows driven from a motor, this main wind-chest having a valved connection with an action wind-chest connected with openings in the tracker-board and controlling pneumatics for operating pickers employed for sounding the strings, the said openings in the tracker-board being controlled by the note-apertures J in the note-sheet.

The pickers referred to are mounted on a frame or bar arranged to swing and controlled by pneumatics having valved connections with the action wind-chest, the valves in the said connections being controlled by rows or apertures $J^9$ and $J^{10}$, located on the sides of the note-sheet and arranged to register alternately with corresponding openings in the tracker-board. Now when one of the tracker-board openings is uncovered by corresponding note-sheet apertures $J^9$ and $J^{10}$ then the pneumatics for operating the picker frame or bar are alternately collapsed and exhausted, and this action of the pneumatics causes a swinging of the picker frame or bar. The note-sheet apertures $J^9$ and $J^{10}$ are staggered and spaced equal to the note-apertures of the note-sheet, so that for each note-aperture registering with one of its tracker-board openings one of the apertures $J^9$ or $J^{10}$ registers with its corresponding tracker-board opening and hence a swinging motion is given to the picker frame or bar for each note-aperture J of each transverse row of note-apertures on the note-sheet.

The valve for connecting the main wind-chest with the action wind-chest is controlled by a pneumatic having connection with the main wind-chest and with a tracker-board opening controlled by a starting-slot $J^4$ in the note-sheet. This starting-slot $J^4$ is arranged at the beginning of the note-sheet adjacent to the bar $J^3$, and preferably located near the middle of the note-sheet. A slot $J^8$ is formed in the note-sheet near the end thereof, and this slot is adapted to register with a tracker-board opening controlling mechanism for stopping the forward travel of the note-sheet over the tracker-board and also for controlling mechanism for rewinding the note-sheet on its spool and unwinding it from its winding-up roller. The slot $J^8$ is located a distance from the end of the note-apertures J to provide a sufficient blank length of note-sheet between the tracker-board and the spool on which the end of the note-sheet is secured.

Having thus described our invention, we claim as new and desire to secure by Letters Patent—

1. A note-sheet for self-playing musical instruments having note-apertures, a starting-slot in advance of the said note-apertures, a stopping-slot in the rear of the said note-apertures, and rows of apertures, the apertures in one row being staggered relative to the apertures in the other row and each aperture in a row being approximately in transverse alinement with a note-aperture.

2. A note-sheet having note-apertures, for pickers to sound strings, and apertures staggered and spaced equal to the said note-apertures of the note-sheet, the said staggered apertures controlling the motion of a swing-frame on which the pickers are held.

3. A note-sheet having note-apertures, and rows of apertures, the apertures in the rows being staggered, each aperture in a row being in transverse alinement with a note-aperture.

4. A note-sheet for self-playing musical instruments having note-apertures, a starting-slot in advance of the said note-apertures, a stopping-slot in the rear of the said note-apertures, and rows of apertures, the apertures in one row being staggered relative to the apertures in the other row and each aperture in a row being approximately in transverse alinement with a note-aperture, and the apertures in each row being spaced equal distances apart.

In testimony whereof we have signed our names to this specification in the presence of two subscribing witnesses.

WILLIAM R. VERSTRAELEN.
CHRISTIAN ALTER.

Witnesses:
THEO. G. HOSTER,
EVERARD BOLTON MARSHALL.